US008806026B2

(12) United States Patent
MacLarty et al.

(10) Patent No.: US 8,806,026 B2
(45) Date of Patent: Aug. 12, 2014

(54) METHOD AND APPARATUS FOR FORMING AND MAINTAINING A NETWORK OF DEVICES

(75) Inventors: Glen M MacLarty, Pyrmont (AU); Michael Fry, Collaroy Plateau (AU)

(73) Assignee: British Telecommunications PLC, London (GB)

( * ) Notice: Subject to any disclaimer, the term of this patent is extended or adjusted under 35 U.S.C. 154(b) by 1375 days.

(21) Appl. No.: 10/534,470

(22) PCT Filed: Nov. 12, 2003

(86) PCT No.: PCT/GB03/04900
§ 371 (c)(1),
(2), (4) Date: May 11, 2005

(87) PCT Pub. No.: WO2004/047403
PCT Pub. Date: Jun. 3, 2004

(65) Prior Publication Data
US 2006/0080410 A1 Apr. 13, 2006

(30) Foreign Application Priority Data
Nov. 15, 2002 (GB) .................................. 0226762.3

(51) Int. Cl.
*G06F 15/16* (2006.01)
(52) U.S. Cl.
USPC .......................................... 709/228; 709/203
(58) Field of Classification Search
USPC .................................. 709/208, 223, 224, 228
See application file for complete search history.

(56) References Cited

U.S. PATENT DOCUMENTS

| 4,864,559 | A  | * | 9/1989  | Perlman ........................ 370/256 |
| 5,574,860 | A  | * | 11/1996 | Perlman et al. ............... 709/220 |
| 5,706,440 | A  |   | 1/1998  | Compliment et al. |
| 6,286,047 | B1 |   | 9/2001  | Ramanathan et al. |
| 6,993,587 | B1 | * | 1/2006  | Basani et al. ................. 709/229 |
| 2001/0043569 | A1 | * | 11/2001 | Wood, Jr. ...................... 370/256 |
| 2003/0115340 | A1 | * | 6/2003 | Sagula et al. ................. 709/228 |

FOREIGN PATENT DOCUMENTS

EP    1 229 442    8/2002

OTHER PUBLICATIONS

GB Search Report, Mar. 20, 2003.
PCT International Search Report, Mar. 18, 2004.
deMeer, H., "A Performance Management Architecture for Peer-to-Peer Services Based on Application-Level Active Networks", IEEE Network Operations and Management Symposium, Apr. 15, 2002, pp. 927-929.

(Continued)

*Primary Examiner* — Emmanuel L Moise
*Assistant Examiner* — Mahran Abu Roumi
(74) *Attorney, Agent, or Firm* — Nixon & Vanderhye PC

(57) ABSTRACT

A network of enabled devices is arranged to permit computer programs to be dynamically downloaded onto and executed on the devices. The devices are connected to one or more general computer networks containing a plurality of non-enabled devices not arranged to permit computer programs to be dynamically downloaded onto and executed on the devices. Each enabled device has a list of the addresses of a sub-set of said enabled devices and each device consecutively attempts to contact each of the devices in the sub-set of devices until either one of the sub-set of devices is contacted or the device determines that the next device in the subset of devices which it is to contact is itself.

15 Claims, 11 Drawing Sheets

(56) References Cited

OTHER PUBLICATIONS

Ghosh, Atanu et al., "An Architecture for Application Layer Routing", Lecture Notes in Computer Science, vol. 1942, Oct. 16, 2000, pp. 71-86.

Ghosh, Atanu et al., "An Infrastructure for Application Level Active Networking", Computer Networks, vol. 36, No. 1, Jun. 2001, pp. 5-20.

* cited by examiner

| Data Field Name | Data Field Type | Illustration of Data Field Type |
|---|---|---|
| Discovery Protocol Version Number | Integer | |
| Own Node Info | Node Info Object | Node Info Object: Host Name (string) \| IP address (integer) \| Port No (integer) |
| WKRN List | Vector of Node Info Objects | { Node Info object, Node Info object, ... } |
| Expire Timer | Time-to-go | |
| List of Children | Vector of Child Objects | { Child Object: Node Info Object \| No of Descendants \| No of times registered, ... } |
| Registration List → Normal Nodes | Vector of Node Info Objects | { Node Info object, Node Info object, ... } |
| Registration List → Root Nodes | Vector of Peer Info Objects | { Peer Info Object: Node Info Object \| No of descendants, ... } |

Figure 3

Registration Flowchart

WKRN Election  Figure 6

Registration Handling Flowchart

Child Registration

Node Methods

WKRN Methods

IP Telephony Overlay

IP Telephony Construction

METHOD AND APPARATUS FOR FORMING AND MAINTAINING A NETWORK OF DEVICES

This application is the US national phase of international application PCT/GB2003/004900 filed 12 Nov. 2003 which designated the U.S. and claims benefit of GB 0226762.3, dated 15 Nov. 2002, the entire content of which is hereby incorporated by reference.

FIELD OF INVENTION

The present invention relates to a method for combining a plurality of interconnected devices into a network structure which permits each device in the network to communicate with any other one of the devices, and to the devices operable to carry out such a method.

BACKGROUND TO THE INVENTION AND PRIOR ART

Within the Internet in particular, and within large computer networks in general, there are typically a number of devices whose primary task is to route data packets through the network from a source to a destination (ie routers). Additionally, there are a large number of general processing devices which tend to store data for transmission over the network (eg web servers) and/or receive data from remote devices on the network for display to an end user (eg client terminals). The present inventors have realised that in such networks, there are often circumstances in which it would be desirable to have some processing performed on data (or some other function) within the network rather than just at the source and destination devices.

For example, where a web-server has a video file which an end user remote from the web-server would like to view, it may be convenient if the web-server transmits the entire file using a reliable transport protocol such as the Transport Control Protocol (TCP) to a point in the network which is relatively close to the client device at which the end user is located, and then for the network to forward on the file using a streaming protocol such as the RealTime Protocol (RTP).

One possibility for enabling such functionality within the network would be to provide the routers with enhanced functionality and to permit packets of data travelling through the routers to access this enhanced functionality by including appropriate codes in the headers of packets. However, there are a number of reasons why this is not generally deemed to be a feasible thing to do in practical networks, primarily because of the risk of the software causing the devices to malfunction in their primary task of ensuring correct routing of data packets through the network.

The present inventors have therefore proposed that as an alternative, a number of devices (eg web-servers) already connected to the network could be configured to provide data processing functionality "within the network" (ie somewhere other than either the source or destination device, as will be apparent later in the description) at a relatively high "Application Layer" level (as opposed to the lower "Network Layer" level with which routers are concerned). In particular, the inventors have proposed to deploy active elements as application level entities. The resulting system is referred to throughout the present application as an Application Level Active Network (ALAN). There are two key components of this approach. Active entities are referred to as "proxylets". Example proxylets have been written by the present inventors using the object oriented programming language Java and are identified by a reference. These proxylets can be downloaded and executed on a suitably configured device. Such a device, once suitably configured, is referred to as an Execution Environment for Proxylets (EEP). For a full description of an example implementation of an EEP and several proxylets see A. Ghosh, M. Fry, G. MacLarty: "An Infrastructure for Application Level Active Networking." Computer Networks, 36 (1) (2001) pp. 5-20.

In the above mentioned paper, it is described how the EEPs should organise themselves into an ordered tree-like structure, with each EEP, once integrated in to the EEP network, forming a node in the tree. Each EEP maintains a record of the EEPs which are directly above it in the tree hierarchy (going right the way up to a Master Root Node) together with all of the nodes which are immediately beneath it (ie its children nodes, but not its children's children nodes or further removed descendants).

In the implementation of EEPs described in the above mentioned paper, in order to set up a new EEP, the new EEP attempts to register itself with the Master Root Node EEP, the internet address of which is hard-coded into the program which is run to set-up the new EEP.

The present inventors have realised that such an implementation might encounter difficulties if it were used for implementing a large number of EEPs in a very large computer network such as the Internet. In particular, if the device on which the Master Root Node EEP 1 is running were to go out of service for an extended period of time, newly established EEPs would not be able to integrate themselves into the established network of EEPs. Furthermore, if the computer network to which the host devices are connected were to become partitioned such that one or more groups of EEPs could no longer communicate with the Master Root Node, the one or more groups severed from the Master Root Node would cease to be able to operate in a well-defined manner.

SUMMARY OF THE INVENTION

According to a first aspect of the present invention, there is provided a method of forming and maintaining a network of enabled devices, the enabled devices being arranged to permit computer programs to be dynamically downloaded onto and executed on the devices, and the devices being connected to one or more general computer networks containing a plurality of non-enabled devices not arranged to permit computer programs to be dynamically downloaded onto and executed on the devices, the method comprising the steps of transmitting to each enabled device a list of the addresses of a sub-set of said enabled devices; and consecutively attempting to contact each of the devices in the sub-set of devices until either one of the sub-set of devices is contacted or the device determines that the next device in the subset of devices which it is to contact is itself.

With such a method, it is possible for a new node in the network to be set up even in the event that one or more of the well known root nodes are not functioning, provided at least one of these nodes is functioning. Furthermore, by strategically placing the well known root nodes in well separated locations, in the event of a partition of the network, the nodes in a partitioned part will be able to continue to function to a degree in a well defined manner provided at least one well known root node is included in the partitioned part of the network.

Preferably, each well known root node registers with only a single "Master" root node at any one time, with the possibility of each well known root node becoming a master node if it is not able to contact one of the well known root nodes appearing with higher priority on its list of well known root nodes than itself. This minimises the amount of registering which needs to be done compared to a method in which each well known root node registers with each other well known root node, whilst still providing a robust system, in which any of the well known root nodes can become a master root node to maintain a well defined manner of operation of both the other well known root nodes and the other normal nodes in the event of a device failure or network partition.

BRIEF DESCRIPTION OF THE DRAWINGS

In order that the present invention may be better understood, an embodiment thereof will now be described, by way of example only, with reference to the accompanying drawings in which:

FIG. 3 is a table illustrating the data stored at each node to permit each node to carry out the steps for joining into and maintaining themselves within the network according to the method of the present invention;

DETAILED DESCRIPTION OF EXEMPLARY EMBODIMENTS

Figure 1:
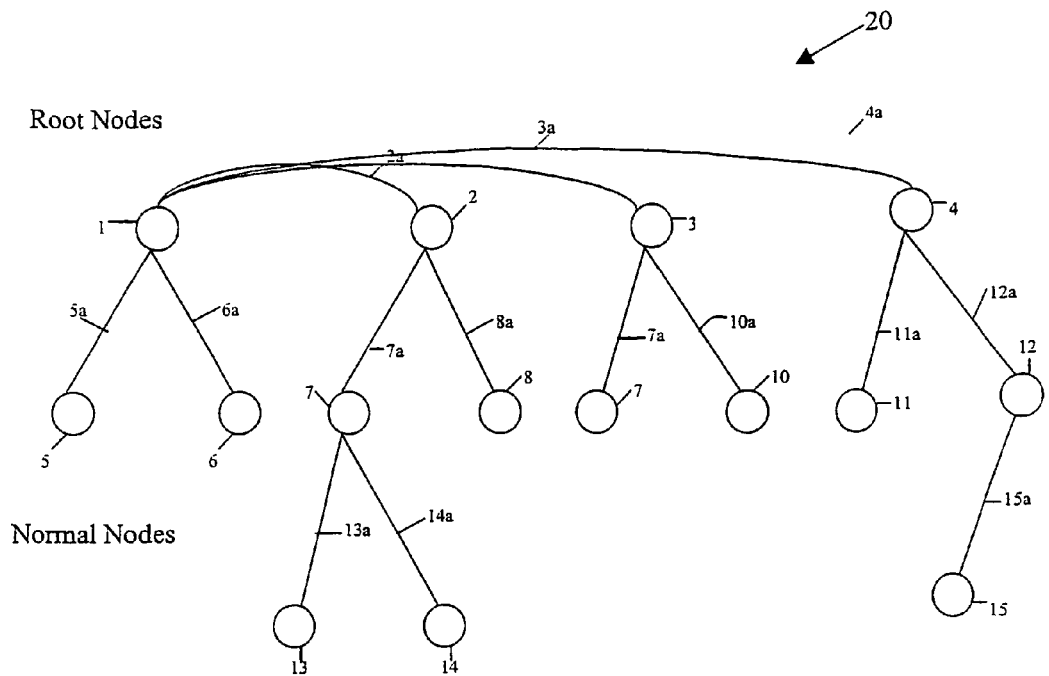
FIG. 1 is a schematic illustration of an example arrangement of nodes arranged in an order consistent with the method of the present invention.

Referring firstly to FIG. 1, an example method of operating Application Level Active Network (ALAN) nodes to enable each node to arbitrarily join into and leave the mesh of nodes in a manner which maintains the overall mesh in a coherent structure. As mentioned above, the ALAN provides a platform for the dynamic deployment of application level code modules, or active services. These services execute upon active service nodes that are distributed across the network and which are available to host active services. Active services may be deployed on a single node, e.g. a transcoder service, or across a network of nodes, e.g. a content distribution network. In the latter case services are realized through an overlay network: a service network constructed and maintained at the application level, independent of the underlying IP network which is used to transport information between overlay nodes.

The present embodiment permits the generic support of overlay networks. The system within which the present embodiment is designed to operate is a large-scale and varying community of active service nodes spread across the global Internet. A discovery algorithm or protocol is used to manage this active service mesh. This protocol is what enables nodes to arbitrarily join and leave the mesh. It maintains link information whereby any node can be discovered by any other node. The discovery algorithm is scalable and robust. Service overlays can then be deployed and maintained on top of the discovery mesh in a manner described in greater detail below. This separation is desirable since service overlays are typically constructed and optimised with regard to one or more metrics, e.g. network distance and/or proximity to clients and servers. Services may also have node resource requirements, such as special hardware. According to the present embodiment, there is provided a common discovery infrastructure, which is then used to build service-specific overlays.

Thus, referring to FIG. 1, each of the active service nodes 1-15 is joined into the mesh 20 such that each node registers with only a single node (indicated by the joining lines 2a-14a illustrating that nodes 2-15 register with nodes 1,1,1,1,1,2,2, 3,3,4,4,7,7,12 respectively), although some nodes have more or less than one node registered to them (nodes 5, 6, 13, 14, 8, 9, 10, 11 and 15 have no nodes registered with them, node 12 has only one node registered with it, nodes 2, 3, 4 and 7 have two nodes registered with them and node 1 has five other nodes—nodes 2, 3, 4, 5 and 6—registered with it).

The topmost layer of nodes illustrated in FIG. 1 (nodes 1, 2, 3 and 4) are hereinafter referred to as Well Known Root Nodes (WKRNs) and have slightly different functionality to normal nodes, as will be described in greater detail below. In this embodiment, the WKRNs are identified by their inclusion in a WKRN list, which lists the identities or locations of the nodes and which, in the present embodiment, lists the host name and IP address of the server on which the EEP forming the node is running together with the port number of the server used by the EEP (in the present embodiment, the port number used is 1099 which is the default port number on which the Remote Method Invocation (RMI) register listens); this is sufficient information for any other device connected to the same network as the server on which the EEP is running to contact the EEP, (unless the network has become partitioned, or the server in question has gone down, etc.). If a node determines that its own location matches one of the locations given in the WKRN list (the WKRN list is included in the original Java ARchive (JAR) file used to set up a new EEP), it identifies itself as a WKRN and knows to behave slightly differently to normal (ie non-WKRN) nodes, as is explained in greater detail below.

In brief overview, the system of the present embodiment operates as follows to join and maintain new nodes. On first coming into existence, a new EEP determines whether it is a WKRN or a normal node. In either event it then reads its WKRN list and tries to contact one of the listed WKRNs. If it is a WKRN itself, it tries to find the WKRN which is currently acting as master WKRN and, on doing so, it undergoes a special form of registration with the acting Master WKRN in which it receives information about all of the other running WKRNs together with the number of descendents (the node's children and children's children, etc—ie node 2 has four descendents and node 3 has two descendents in FIG. 1) that each WKRN has. Thereafter it waits for normal nodes to register with it, for requests to be received, etc.

If, on coming into existence, the EEP determines that it is not a WKRN, it still consults its WKRN list and attempts to make contact with one of the WKRNs listed. Upon contacting any of the WKRNs, the respective WKRN looks to see if any of the other running WKRNs have fewer descendents than itself, if so it hands the new node off to that WKRN, otherwise it either registers the new node as a direct child of itself (if it has space—in the present embodiment, each node is only permitted to register up to two direct children); if the WKRN does not have space itself the new node is passed down the tree until one of the descendents of the WKRN is reached which does have space to register a new child whereupon the new node is registered there.

For example, referring to FIG. 1, if a new normal node were to come into existence, it would consult its WKRN list and find node 1 listed first of all. It would then send a request to register with node 1 to node 1. Node 1 would receive the request, determine that no other nodes have fewer descendents than it (it has only 2 descendents, nodes 5 and 6—nodes 2, 3 and 4 don't count as they are WKRNs—which is fewer descendents than nodes 2 and 4 and the same number of descendents as node 3), and therefore look to see if it can register the new node as a direct child of itself. However, node 1 has no space for more children of its own and therefore selects (at random) one of its children, say node 5, and hands the new node off to this selected child. Node 5 determines that it does have space and therefore registers the new node as a child.

Figure 2:
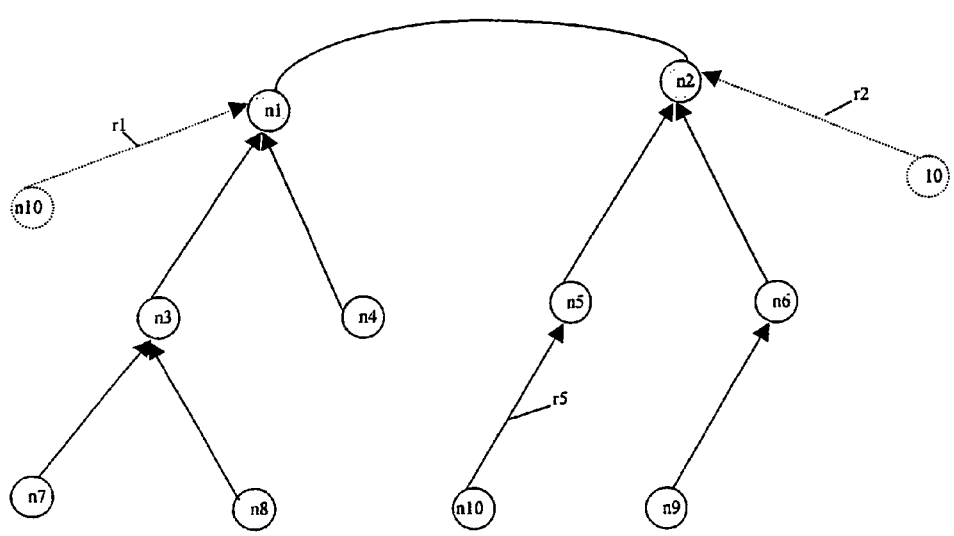
FIG. 2 is a schematic illustration of a second example arrangement of nodes arranged in an order consistent with the present invention and illustrating the process by which a new node joins the network.

As a second example, consider FIG. 2. FIG. 2 illustrates a slightly different mesh having 9 nodes n1-n9 when a new node, n10, comes into existence. In this case, only two of the nodes, n1 and n2, are WKRNs. New node n10 consults its WKRN list and therefore firstly tries to register with node n1 (as indicated by dotted line r1). Acting Master WKRN n1 determines that WKRN n2 has fewer descendents than itself and therefore hands node n10 off to node n2. New node n10 therefore attempts to register with WKRN n2 as indicated by dotted line r2. WKRN n2 determines that no other WKRN has fewer descendents than itself and that it does not have space to register the new node as a child itself. WKRN n2 also determines that its first child, n5, has fewer descendents than its second child, n6, and therefore hands the new node, n10, off to this node n5. New node n10 therefore finally attempts to register with node n5 and is successful as indicated by the solid line r5.

Referring now to FIG. 3, there is shown, in tabular form, the information stored by each node, in the present embodiment, to permit each node to carry out the steps necessary to perform the above described discovery algorithm or protocol.

As can be seen from the first column of FIG. 3, each node maintains six data fields for use with the discovery protocol. The six data fields are: Discovery Protocol Version Number; Own Node Info; WKRN List; Expire Timer; List of Children; and Registration List. In all but the last of these fields, the type of data stored in each of these fields is the same for normal nodes and WKRNs.

As can be seen from the second and third columns of FIG. 3, the type of data stored in each of these fields is as follows:

the Discovery Protocol Version Number field simply stores an integer in this embodiment, with later versions of the protocol having higher numbers;

the Own Node Info field stores a Node Info Object, each of which, as shown in the third column, includes three fields of its own, namely a Host Name field which stores a string, an IP Address field which stores an IP Address (a four-byte binary number—which also corresponds to an "int" primitive data type in Java), and a Port Number field which stores the port number of the node, also as an integer;

the WKRN List field stores a vector (a type of array commonly used in Java which can contain an unspecified number of elements) of Node Info Objects each of which stores the host name, IP address and port number of a respective WKRN;

the Expire Timer field holds a timer object which generates a signal after a specified length of time which can be modified by the node at any time, but which if left unmodified will count down until the time to go has reached zero whereupon the alarm signal is generated, thus enabling a particular action to occur after a certain specified length of time;

the List of children field stores a vector of child objects, each of which, as can be seen from the third column of FIG. 3, includes a node info object identifying the child node's location in the underlying data network, a number of descendents field which stores (as an integer) the number of descendents that the child node has, and a number of times registered field which stores (as an integer) the number of times that the child node has successfully (and in an uninterrupted sequence) registered with the present node; and finally the Registration List field stores:

a) in the case of normal nodes, a vector of Node Info Objects (which nodes these correspond to is described below), or b) in the case of WKRNs, a vector of Peer Info Objects, each of which contains a Node Info Object together with a number of descendents field (each Peer Info Object corresponds to a respective running WKRN as is explained in greater detail below).

Figure 4:
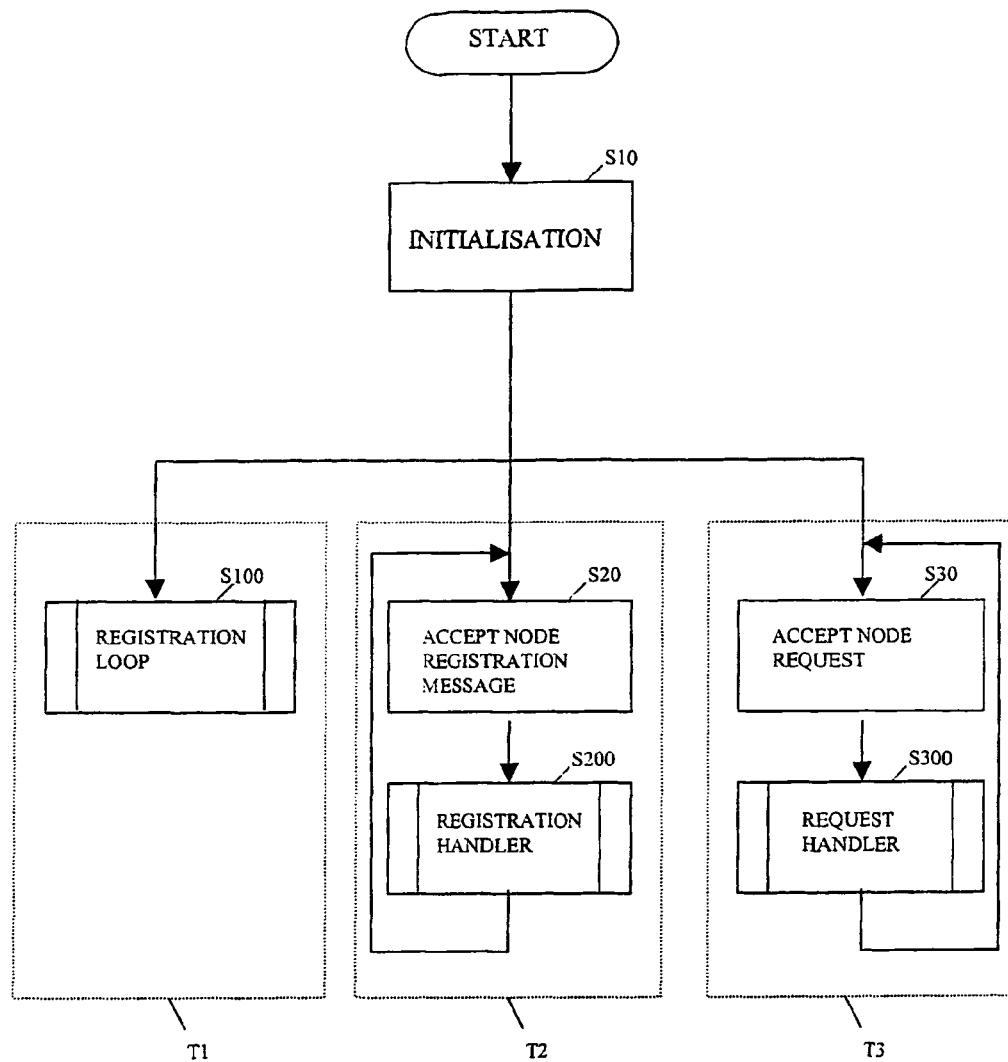
FIG. 4 is a flowchart illustrating the principle threads of operation performed by a node upon initialisation of a node.
Figure 5:
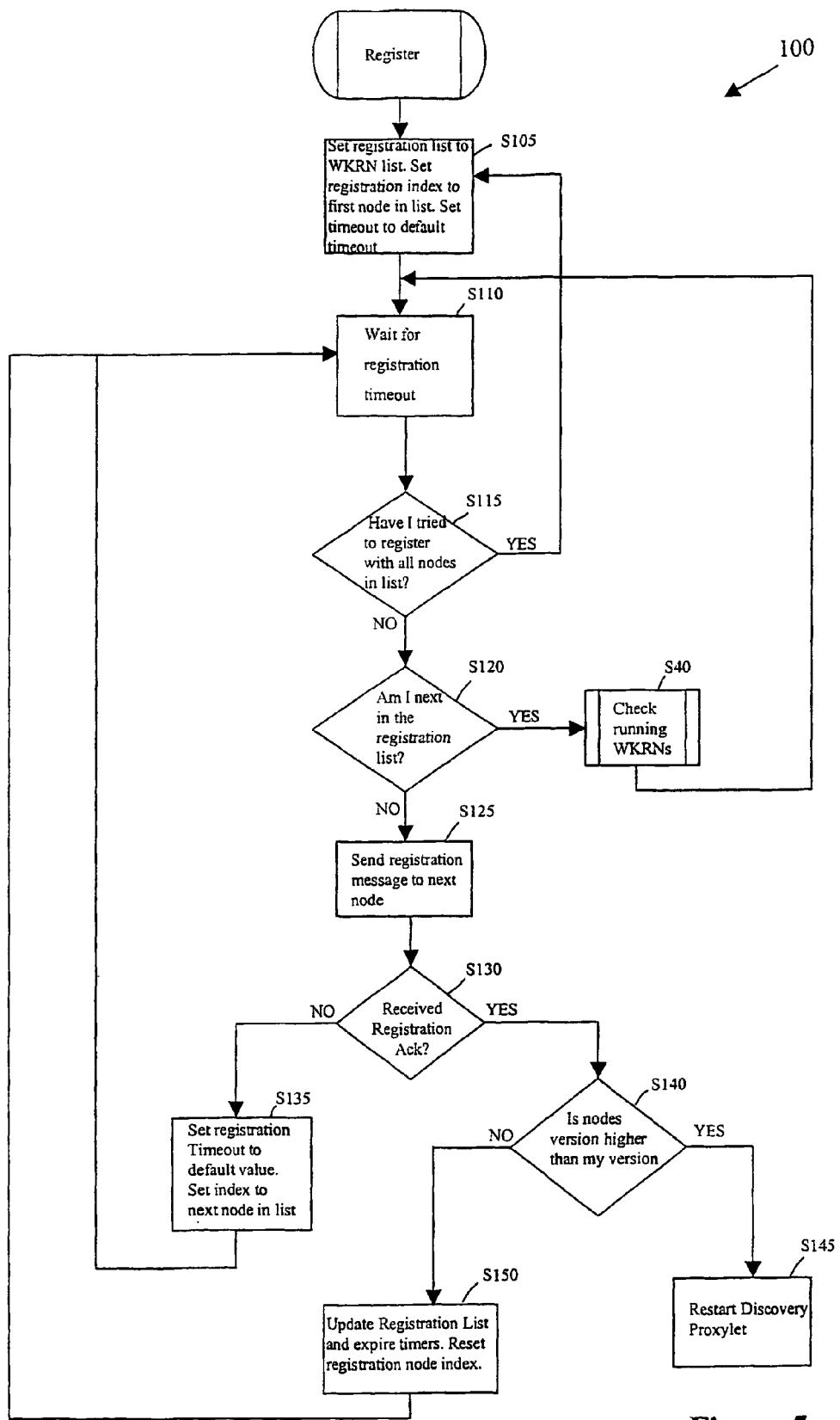
FIG. 5 is a flowchart illustrating the Register thread of the flowchart of FIG. 4.

As can be seen from FIG. 4, the ALAN discovery protocol of the present embodiment is made up of three main functional threads. These are:

1) a Registration Loop, T1, which controls the issuance of registration request messages;

2) a Registration Handler Loop, T2, which controls the processing of received registration requests from other nodes; and 3) a Request Handler Loop, T3, which controls the processing of requests for information from other nodes.

These loops are described in greater detail below with reference to FIGS. 5 to 10. In the present embodiment, each loop, T1, T2, T3, comprises a separate thread implemented using the Java object oriented programming language. The terms registration loop, registration handler loop and request handler loop may therefore be used interchangeably with the terms registration thread, registration handler thread and request handler thread respectively throughout this specification.

The protocol revolves around the main registration thread, T1, performing periodic registration attempts to a set of nodes until one is successful. The registration handler thread, T2, on the remote node performs the processing of this request. The reply message received from the remote node will contain a new set of nodes to attempt registration with after a defined timeout.

The discovery protocol is implemented as a proxylet running on the ALAN architecture and is described below in this context.

The discovery protocol makes use of a set of ALAN nodes that are assumed to be permanently running with high levels of network connectivity and availability. These nodes are the Well-Known Root Nodes (WKRNs). In the present embodiment WKRNs have no additional requirements of the hardware or host servers on which they are to run, however, it is preferable that they should have high network availability. The root nodes (nodes 1, 2, 3 and 4 in FIG. 1) are the core of the structure and link parts of the discovery network.

During the initialisation, S10, of the discovery proxylet (which implements the Discovery protocol), the list of WKRNs is loaded and stored in the WKRN List field. In the present embodiment, the list is distributed with the Discovery proxylet, but in alternative embodiments the list could also or alternatively be stored on a web server and referenced as a URL. Also during the initialisation step, S10, the node queries the host on which the node is running to obtain the own node information which is then stored in the Own Node Info field as a Node Info Object, and it writes the Discovery Protocol Version Number into this respective field (this is also distributed with the Discovery Proxylet in the present embodiment).

Registration

Registration is the process where a node sends a request to another node, passing it specific information and being returned a set of information. This process also results in state information being updated on the calling and handling nodes depending on whether registration has been successful. The registration process is identical for all nodes. WKRNs however can potentially attempt registration with themselves and therefore must handle this situation. This is described below.

Node Registration

All nodes undertake the same process when performing registrations to a remote node. A registration request is made, with the following data being sent:

1. Node Information (Hostname, IP address, Port)
2. Discovery Protocol Version (Version of registering node)
3. Child Count (Number of children registered below this node)

The node handling the registration then uses this information to determine whether this node is already registered at this point in the tree, whether it should be handed to one of the children or to another WKRN if the handling node is a WKRN. The registration handling behaviour is described further in this document.

Once the handling node has processed the registration information it will return a set of information to the node consisting of:

1. Discovery Protocol Version (Version of the node handling the registration)
2. Registration Timeout (Number of second to wait before reregistering)
3. List of Nodes (Nodes to attempt next registration with)

The information returned to the node is then processed in the following way. Version consistency is checked through a comparison of the nodes version number and the version included in the registration acknowledgement. If the version in the acknowledgement is higher, the node will restart.

The node will use the registration timeout to reset a timer to trigger the next registration. The node will then begin this process again, attempting to register with the first node in the list returned in the registration acknowledgement. If it cannot contact the first node in the list it will set a new timer with the default timeout and wait before contacting the next node. If all nodes in the list are attempted and it does not contact any, it will then load the list of WKRNs as the registration list, and reset the expire timer to the default value. This is to prevent registration storms where a node sends out a large number of registrations in a short period when it fails to make contact.

Well-Known Root Node Registration

As explained above, the initialisation process involves all nodes loading the list of WKRNs, providing the information to allow a node to determine whether it is a WKRN. This is necessary because WKRNs handle registration requests and process the registration acknowledgements in a different way to normal nodes.

The protocol, in the present embodiment, has one of the WKRNs, called the acting Master WKRN (or just the Master WKRN), selected to permit other WKRNs to register only with this Master WKRN which therefore maintains a list of all of the WKRNs that are currently running. This is done to reduce the number of registrations throughout the system.

With a Master WKRN, each other WKRN only needs to register with the master rather than all other WKRNs. The master returns to each WKRN the list of other nodes running in the system, a subset of the full WKRN list loaded at initilisation time. This reduces the number of registrations for n running WKRNs from $C(n,n-1)$ to $n-1$, each period. Since each WKRN also stores a list of all peers, there is sufficient state information to permit each WKRN to perform the same functions as the Master WKRN without requiring every WKRN to register with every other WKRN. Thus no functionality is lost compared with the case where every WKRN registers with every other WKRN but a lot less signalling traffic overhead is required.

The registration message passed by the WKRNs to the master WKRN is identical to that which is passed from any standard node to another other node. However, the returned acknowledgement is different. The list of nodes with which the current node should attempt registration is the list of currently running WKRNs. This list however also contains the number of children registered below each WKRN.

The inclusion of the child count is done, in the present embodiment, to encourage maintenance of a symmetric structure. WKRNs need to know how many descendents other WKRNs currently have, to allow them to perform hand-offs to the least loaded part of the structure. This is not highly critical to maintain the structure, but is performed in order to cause the mesh to tend towards a balanced, symmetrical tree structure which optimises tree traversal.

It can be inferred that the node list for all WKRNs is the set of WKRNs currently running.

The Registration Process

The registration process begins, at step S105 (see FIG. 5), by the node first loading the set of all WKRNs as its initial registration list. The registration list is the list of nodes with which the node should attempt to register. The node also set the registration timeout, the amount of time to wait before trying to register, to a default timeout value. An index into the registration list is also reset to the first element.

After waiting the defined timeout at step S10, flow passes to step S115 in which the node checks whether it has now attempted (unsuccessfully) to register with all of the nodes in the registration list (ie whether the index has been incremented to a value which is higher than the value corresponding to the last node in the registration list). If it has, flow is passed back to step S105; otherwise flow passes on to step S120 in which the node determines whether it is the next node in the registration list. If the next node in the list is this node, the node will undertake the role of Master WKRN; this involves running a "check running WKRNs" subroutine S40 which is illustrated in greater detail in FIG. 6. Additionally, the WKRN sets its registration list to contain itself only. As and when other WKRNs register with it, the now master WKRN will add these to the registration list in the order in which these other WKRNs arrive for registration. If at step S120 it is determined that it is not the next node in the list, flow passes to step S125 in which the node attempts to contact the indexed remote node.

Flow then proceeds to step S130 in which it is determined whether the node has received a reply within a predetermined time. If it is unable to contact the node, flow passes to step S135 in which the index is incremented, the timeout is set to the default, and the node waits for the timeout to expire before attempting to register again with the next node in the registration list (unless the index has reached the end of the list, in which case the list is reloaded with the WKRN list, the index is reset and the timeout is set to the default value).

If contact is made to the remote node (which is determined as a result of the remote node returning a registration acknowledgement containing the data specified above), flow passes to step S140 in which it is checked whether the remote node is running a newer protocol version than the present node. If the acknowledgement reports that the remote node is running a newer version of the protocol the current node restarts. Together with a similar procedure performed by the remote node (discussed below), this ensures version consistency across all nodes in the network, and also allows a new version to be automatically deployed by starting it only on a single node.

Alternatively, if it is determined at step S140 that the remote node is not running a newer version, the registration list and expire timer value included in the acknowledgement are used to update the local registration list and expire timer. Additionally in step S150, the registration index is reset to the first element of the newly updated registration list, and flow then returns to step S110 whereupon the registration loop continues after the new timeout.

Master WKRNs and Election

When a WKRN detects itself as the next node in the list of nodes (see step S120 in FIG. 5), it then undertakes the role of master WKRN. Since a master WKRN does not register with any other node, it performs a maintenance process instead (subroutine S40—see FIGS. 5 and 6). Any node believing itself to be a master WKRN will cycle through the WKRN list loaded at initialisation, to determine if any other WKRNs believe themselves to be a master also. Any node that reports that it registers with itself is identified as believing itself to be a master WKRN. At this point a process called election is undertaken.

The calling master checks to see how many currently running peers the alternate master returns. If the alternate master reports more than the current master, then the current master resets its registration list to that returned by the alternate master node. This results in the current node losing the election, and becoming a slave WKRN of the other master. This is done because the goal of the election is to reduce the number of changes in registrations and the number of peers of a WKRN determines how many re-registrations must take place to converge from a state of two masters to a state having just one master, typically as a result of a formerly partitioned network becoming re-unified.

It is important to note here that if the calling master has more peers than the master it is contacting, it simply disregards the other master WKRN and continues, expecting the remote master WKRN to eventually contact the current master WKRN through its own maintenance process whereupon it will determine that it should become a slave peer to the current master WKRN.

The process of election can occur naturally in the system due to part of the structure being partitioned. As some of the WKRNs determine which peers they can contact they restructure the mesh to include themselves, dropping state information associated with nodes that are currently not contactable. Nodes on the other side of the network partition do the same. In this situation two meshes can continue to run, allowing nodes in the localised networks accessible to each to join, until the network partition is closed and the two meshes restructure to a single mesh when the two master root nodes locate one another.

Subroutine S40

Figure 6:
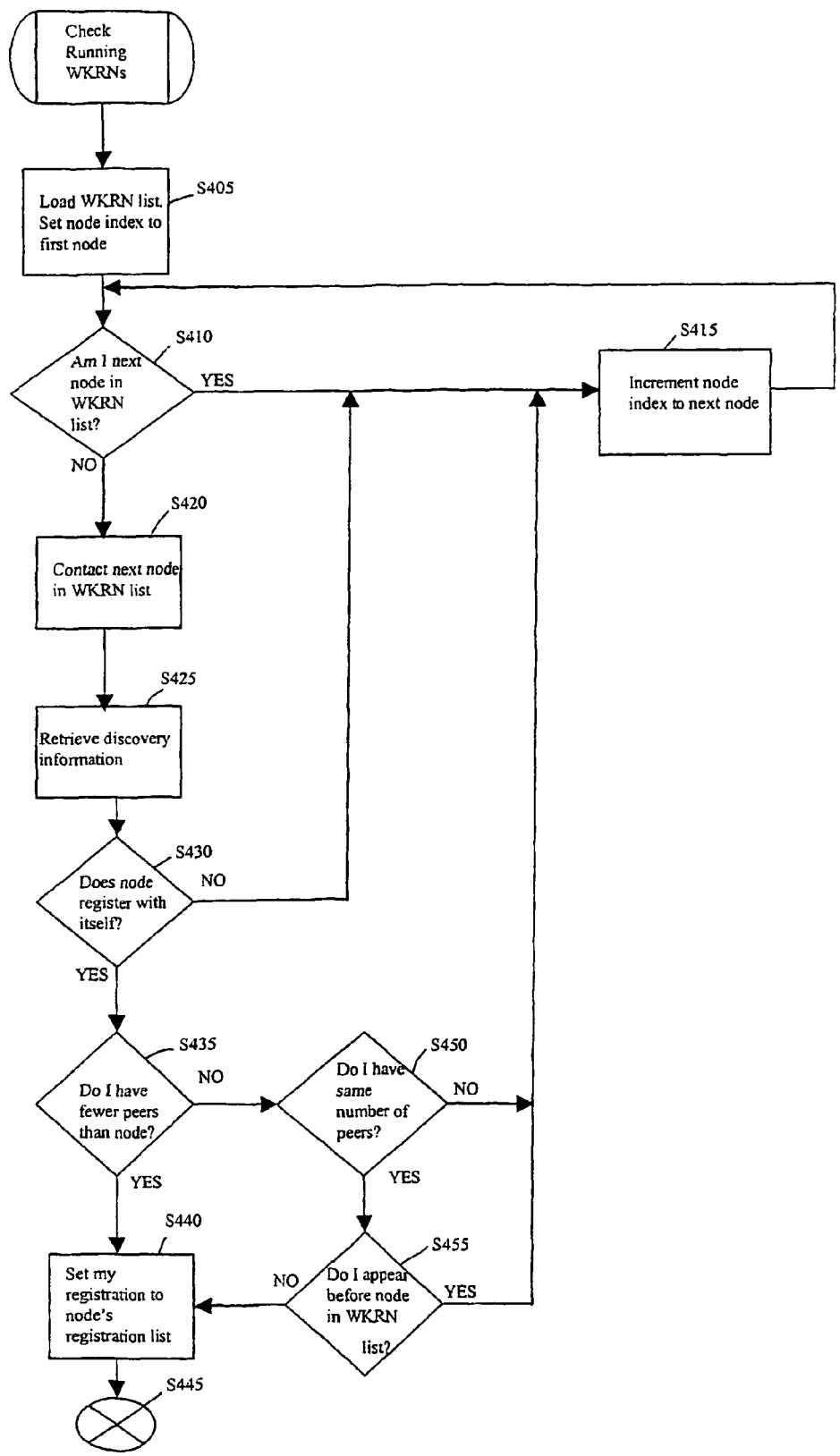
FIG. 6 is a flowchart illustrating the Check Running WKRNs subroutine of the Register thread illustrated in FIG. 5.
Figure 7:
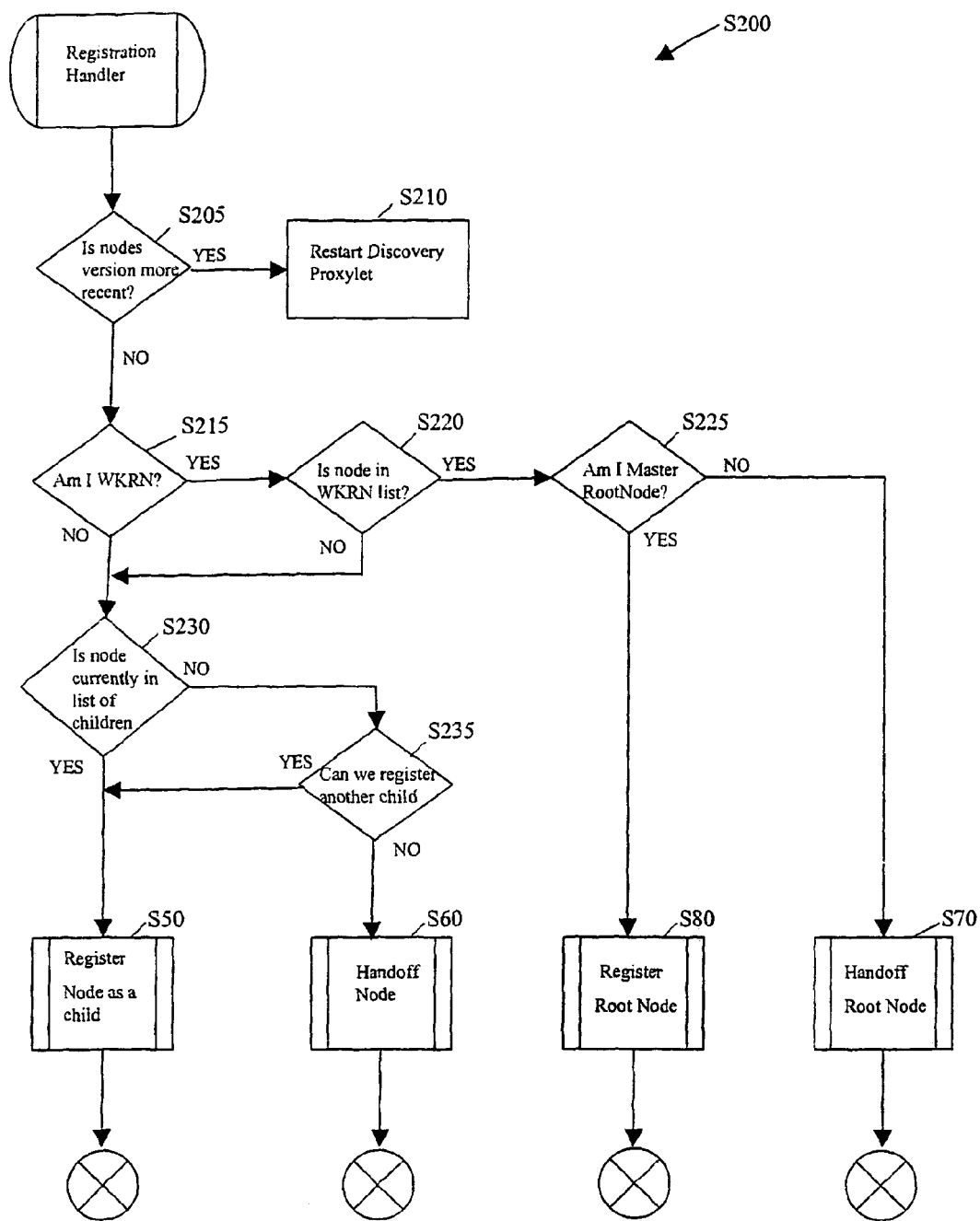
FIG. 7 is a flowchart illustrating the Registration Handling thread of the flowchart of FIG. 4.
Figure 8:
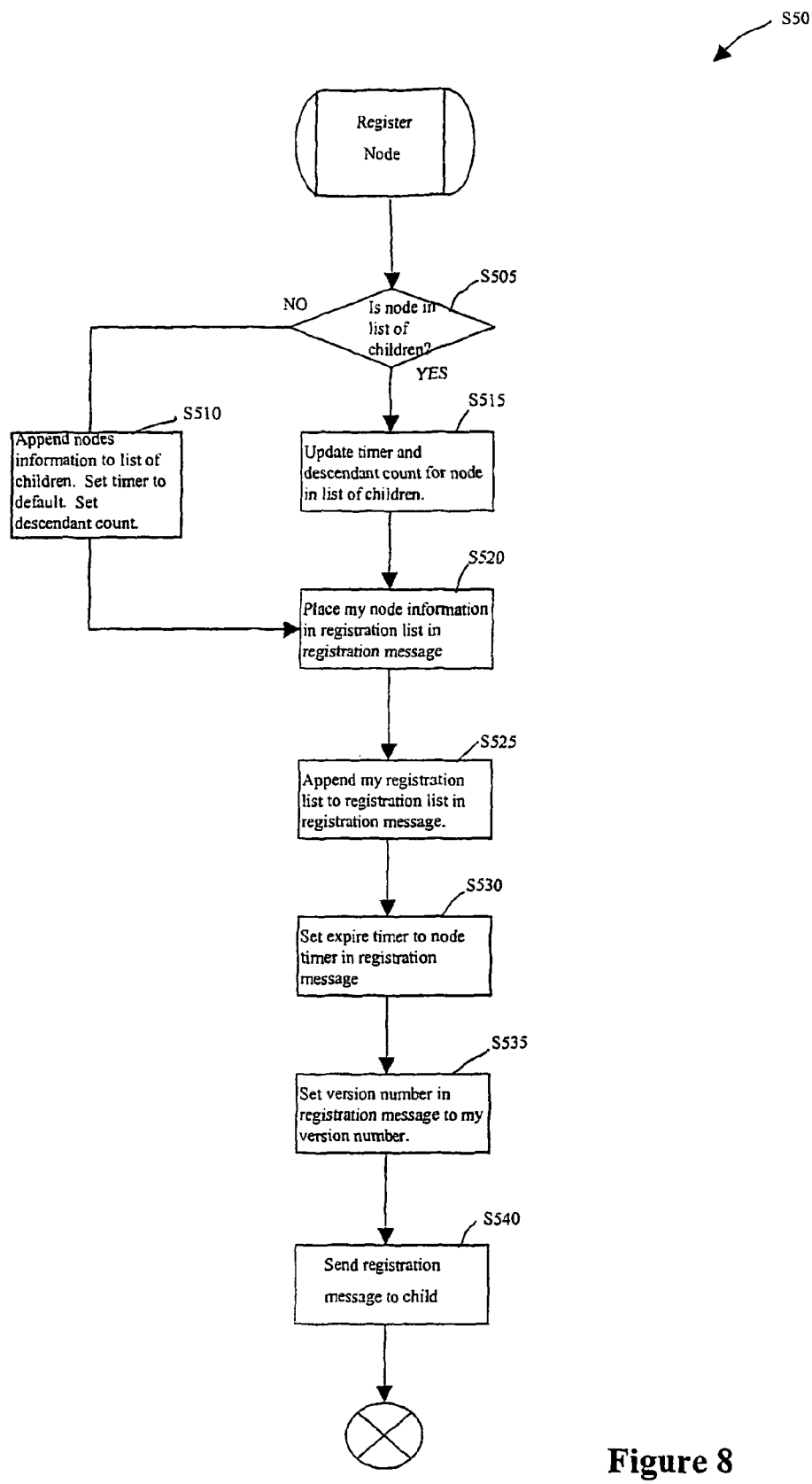
FIG. 8 is a flowchart of the Register Node as a Child subroutine of the Registration Handling thread of FIG. 7.
Figure 9:
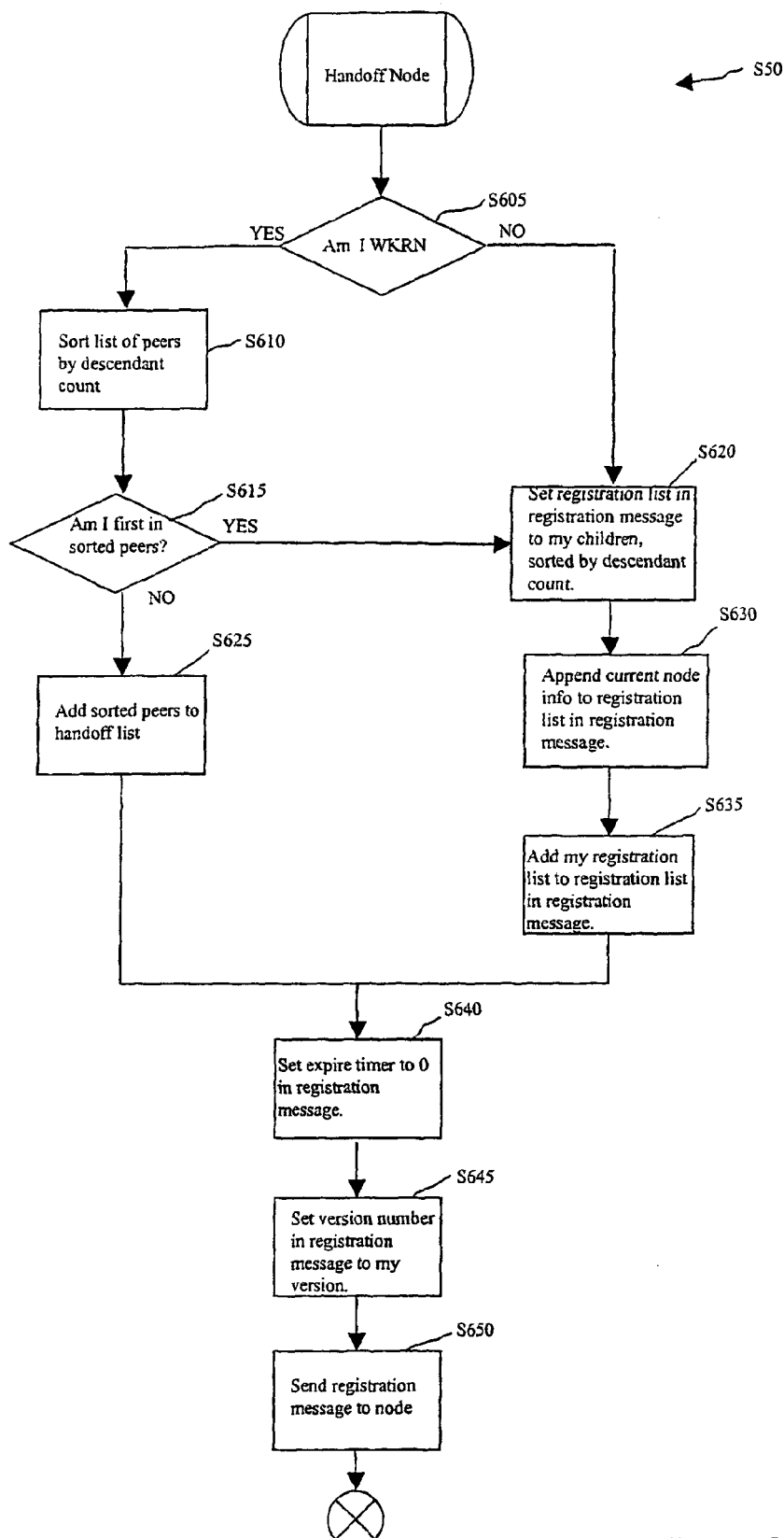
FIG. 9 is a flowchart of the Handoff Node subroutine of the Registration Handling thread of FIG. 7.
Figure 10:
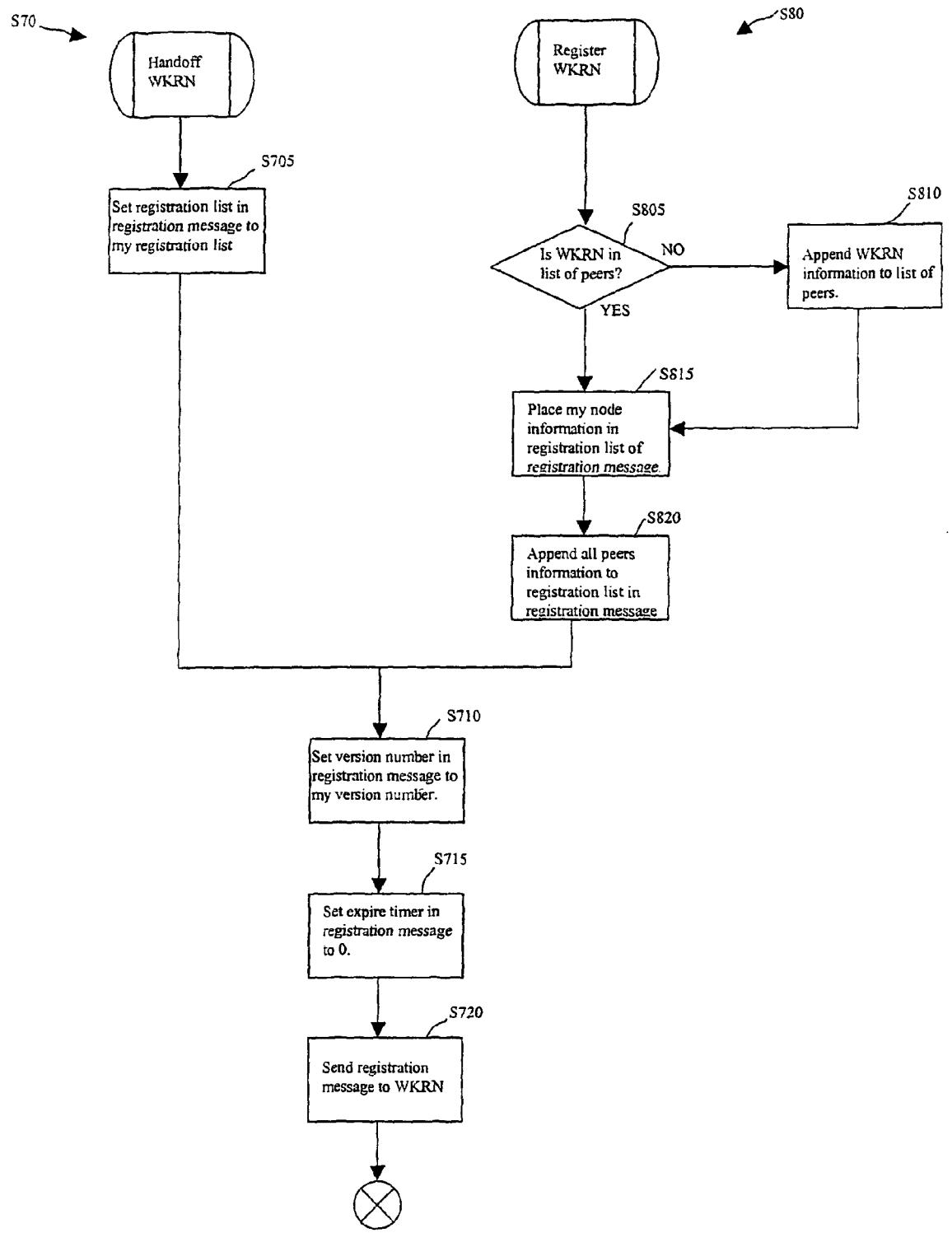
FIG. 10 is a flowchart of the Register RootNode and Handoff RootNode subroutines of the Registration Handling thread of FIG. 7.

A step-by-step description of the "check running WKRN's" subroutine S40, discussed in overview above, is now given with reference to FIG. 6. Thus at step S405 the master node, in respect of the WKRN list, sets an index to refer to the first element in the WKRN list. Flow then proceeds to step S410 in which the node determines whether the WKRN in the WKRN list to which the index is now pointing is itself; if so, flow passes to step S415 in which the WKRN list index is incremented so as to point to the next WKRN in the WKRN list and then flow is passed back to step S410. If at step S410 the current master WKRN determines that the WKRN list index is not pointing to itself in the WKRN list, then flow passes to step S420.

In step S420, the current master WKRN attempts to contact the WKRN pointed to by the WKRN list index. In particular, the master WKRN sends the pointed to WKRN a request for discovery information; if duly received by the contacted WKRN, this request is handled by the remote node's request handler thread T3 which, as mentioned above, causes a reply to be sent which includes the contents of the registration list field (as will become apparent, in the case of WKRNs, this field contains an ordered list of the (believed to be still) currently running peer WKRNs with the first listed WKRN being the master WKRN with which the WKRN is registered). At step S425, the current master WKRN waits a predetermined time for a response to be received from the WKRN which it has just tried to contact. Upon expiry of the predetermined time or upon receipt of a response, flow passes to step S430 in which the current master WKRN determines whether the contacted node also believes itself to be a master WKRN (as determined by examining the returned registration list and looking to see if the first listed WKRN in the registration list is the contacted node itself). If it does not, flow returns to step S410. Similarly, if no response is received at all by the expiry of the predetermined timeout period, then flow is also returned to step S410.

In the event that it is determined at step S430 that the contacted node does register with itself and therefore believes itself to be a master WKRN, then flow passes to step S435 where the election process begins. At step S435 therefore, the current master WKRN firstly checks to see if it has fewer peers than the remote WKRN (by comparing the number of peer info objects in its registration list with the number in the remote WKRN's registration list). If it does have fewer peers than the remote node, the current node determines that it has lost the election and flow passes to step S440 in which the current node replaces the current contents of its registration list with that received from the remote master WKRN. This will cause the current WKRN to attempt to register with the remote WKRN in due course as part of its registration thread T1. Upon completion of step S440 therefore, the current node has ceased to be a master WKRN and the subroutine S40 is therefore terminated at end step S445.

If at step S435 the current node determines that it has either more or an equal number of peers to the remote node, then flow passes to step S450 in which the current node determines if it has the same number of peers as the remote WKRN. If not, the current node concludes that it has more peers than the remote node and it therefore wins the election. Flow is therefore passed back to step S415, the current node continues as a master WKRN and the subroutine S40 is continued.

If at step S450 it is determined that both nodes have the same number of peers, flow is passed to step S455 where the node examines the WKRN list to see which of the current node and the remote node appear first. If the current node appears first in the list, then the current node wins the election and flow is passed back to step S415. Otherwise the current node loses the election and flow is passed to step S440.

Registration Handling

All nodes in the system in the present embodiment handle node registrations. This ensures the distributed nature of the protocol, and is the basis for performing handoffs. When a node performs a registration as described above with reference to FIG. 5, the handling node processes the registration in the following way, performing one of the following actions:

1. If the current node and registering node are WKRNs, one of the following occurs:
    a. If the current node is the Master WKRN, the registering node is registered as a peer.
    b. If the current node is not the Master WKRN, the remote registering node is handed off to the current node's master by being returned the current node's registration list.
2. If the registering node is already registered with the current node as a child, the timer associated with the registration is updated. The remote node is returned a registration list, and an updated timer value, along with the protocol version number of the current node.
3. If the node is not currently registered, the handling node checks to see if it has registration space available. If it does, it will add the remote node to the list of children nodes registered with this node and return to the remote node a registration list, timer value and protocol version number.
4. If the current node is not a WKRN, the remote node is not already registered and there is no registration space available, the remote node is handed off by being passed a registration list containing this node's currently registered children, ordered by their descendent count, the current node, then this node's registration list.
5. If the current node is a WKRN, the remote node is not already registered and there is no registration space available, the current node checks to see if there is a WKRN with a lower number of descendents and if so it hands off the remote node to that WKRN with fewer descendents by passing the remote node a registration list containing the running WKRNs in increasing order of number of descendents. If there are no running WKRNs with fewer descendents, the current node hands the remote node off by being passed a registration list containing this node's currently registered children, ordered by their descendent count, the current node, then this node's registration list.

It is important to note that the main difference between the process of handoff and that of registering a node as a child is that when a node is handed off, the node handling the registration does not store any state about the node that has attempted to register with it. When a node is registered, its node information and number of children are stored by the node handling the registration to allow any other nodes attempting registration to be handed off, and also to allow nodes traversing the tree to find nodes attached to this node.

Generation of the Registration List

The list of nodes handed to a registering node is based upon the above criteria. For any node that is being either registered or re-registered with the current node, the node list is simply the current node, with the registration list of this current node appended. This node's registration list, is its parents list, with its registration list. This recursive process stops at a node that is registered with a WKRN, as WKRNs return to their children themselves with the other peers appended, sorted by child count.

Subroutine S200

A step-by-step description of the registration handler subroutine S200 described in overview above will now be given with reference to FIGS. 7 to 10. Thus at step S205, the first action undertaken by the current registration handling node is to determine if the remote registering node is running a more recent version of the discovery protocol. If so, flow passes to step S210 in which the current node downloads the latest discovery protocol and restarts itself with the new protocol version. Otherwise, flow proceeds to step S215.

In step S215, the current node checks to see if it is a WKRN (by comparing the contents of its own node info field with each of the node info objects in the WKRN list and looking for a match). If it determines that it is not a WKRN flow passes to step S230. Otherwise flow passes to step S220 in which the current node determines if the remote registering node is also a WKRN. If it is determined that the remote node is not a WKRN, flow is passed to step S230; otherwise flow passes to step S220 where the current node determines if it is a master WKRN (by comparing the node info object in its own node info field with the node info object forming part of the peer info object of the first element of it registration list field). If it determines that it is a master root node, flow passes to a "register root node" subroutine S80 which is described in greater detail below with reference to FIG. 10. If it determines that it is not a master root node, flow passes to a "handoff root node" subroutine S70 which is also described in greater detail below with reference to FIG. 10.

As mentioned above, if either the current node or the remote node is not a WKRN flow passes to step S230 in which the current node checks to see if the remote node is already in the current node's list of children nodes. If it is, flow passes to a "register node as a child" subroutine S50 described below with reference to FIG. 8. Otherwise, flow passes to step S235 in which the current node checks to see if it has space to register another child directly. In the present embodiment, the maximum number of direct children (as opposed to indirect descendents) permitted is two. If it is determined that the current node does have space to register a further child, then flow passes to the "register node as a child" subroutine S50. Otherwise, flow passes to a "handoff node" subroutine S60 which is described below with reference to FIG. 9. Upon completion of any of the subroutines S50 to S80 the registration handler subroutine ends and flow is returned to step S20 (see FIG. 4) to await receipt of a new request for registration.

Note that, in the present embodiment, each node with at least one registered child also runs a separate thread (not shown) in which the node periodically sends a request to the or each registered child. If it does not receive a reply before a predetermined timeout period, or if the reply indicates that the first node in the child's registration list is different to the current node, then the current node strikes the child's node off the current node's list of children nodes.

As an alternative method for removing children nodes which for some reason have ceased to function normally (eg because of a partition in the network), each child object stored in the parent node's List of Children field could additionally contain an amount of time until expiry field which is set by the parent node to equal the length of time before the child is due to re-register at the time the parent node sends the registration acknowledgement signal to the respective child node. In a separate thread, the parent node then periodically decrements the expiry time associated with each child until the child re-registers whereupon the expiry time is reset. If the expiry time for any child is decremented to zero before the child has re-registered, the child object is removed from the parent node's list of children. Preferably a small margin for error is introduced into the expiry time by, for example, adding 30-seconds to the expiry time in the parents child objects compared with the corresponding time-to-go until next registration included in the registration acknowledgement signal.

Register Node as a Child Subroutine S50

Upon commencement of subroutine S50 (see FIG. 8) at step S505 the current node determines if the remote node is already included in the current node's list of children. If it is not, flow passes to step S610 in which the remote nodes details are included in a new child object which is appended to the current node's list of children. The Number of descendents of the child node is also set appropriately and the number of time registered field is set to 1. Flow then continues on to step S520.

If at step S505 it is determined that the remote node is already in the current node's list of children, flow passes to step S515 in which the number of descendents of the child object is updated if necessary and the number of times registered field is incremented by one. Flow then passes to step S520.

In step S520, the current node starts to prepare by acknowledgement message to be sent to the remote node by commencing the registration list to be sent in the message with the own node info object. Flow then passes to step S525 in which the current node then appends its own registration list to the registration list to be sent in the acknowledgement message (note that if the current node is a WKRN, then its own registration list will first be re-ordered in increasing number of descendents order). Upon completion of step S525, flow passes to step S530, in which the value for the expiry timer to be included in the acknowledgement message is calculated. In the present embodiment, this is done by multiplying the number of times registered by a default timeout period which in the present embodiment is set to 30 seconds, with a maximum value set at 10 minutes (ie after twenty registrations in the present embodiment). Next, in step S535, the protocol version number is set in the registration message and then in step S540 the message is sent to the remote node, and then the subroutine is ended.

Handoff Node Subroutine S60

Upon commencement of this subroutine at step S605 the current node determines whether it is a WKRN. If it is, flow passes to step S610 in which the node sorts its registration list by number of descendents (in increasing order such that the WKRN with the least number of descendents appears first). Flow then proceeds to step S615 in which the node checks to see if it appears first in the sorted list (indicating that no other WKRNs have fewer descendents than itself). If it does appear first in the sorted list, flow passes to step S620. Also, if at step S605 it is determined that the current node is not a WKRN, flow also passes to step S620. If at step S615 the node is not found to be first in the sorted list, then the registration (also referred to as the handoff list) in the acknowledgement message is set to the sorted peers list and flow is passed to step S640.

In step S620, the registration/handoff list in the acknowledgement message is set to the children nodes in the current node's list of children, ordered by increasing number of descendents. Flow then passes to step S630 in which the current node's own info is added to the registration list for sending in the acknowledgement message before finally adding, at step S635, the current node's own registration list to the registration/handoff list in the acknowledgement list (note if the current node is a WKRN then the sorted registration list is used). Flow then proceeds to step S640. Steps S640, S645 and S650 correspond to steps S530, S535 and S540 respectively except that in step S640 the expire timer value is set to zero so that the remote node immediately tries to reregister. Upon finishing sending the acknowledgement message, the subroutine comes to an end.

Handoff Root Node Subroutine S70

Upon commencement of this subroutine at step S705, the current (non-master) WKRN sets the handoff/registration list to be sent in the acknowledgement message to the same as the current registration list of the current node. Flow then passes to step S710 in which the protocol version number to be sent is set, then to step S715 in which the expire timer in the acknowledgement message is set to zero (so that the WKRN immediately re-registers) and then the message is sent at step S720 and the subroutine is ended.

Register Root Node Subroutine S80

Upon commencement of this subroutine at step S805, the current (Master) WKRN determines whether the remote WKRN is already in the current node's registration list as a peer node. If not, flow passes to step S810 in which the remote WKRN is appended to the current node's registration list as a current running peer WKRN and then flow proceeds to step S815. If at step S805 the remote WKRN is already found to be included in the registration list of peers of the current node, then flow passes immediately to step S815. In steps S815 and the immediately following step S820, the registration list to be sent in the acknowledgement message is set to contain the current master node's own info with the all of the other running peer nodes appended thereto. This can conveniently be achieved by simply placing the current Master node's own registration list into the registration list of the acknowledgement message to be sent. Thereafter, in the present embodiment, the subroutine continues with steps S710, S715 and S720 before ending the subroutine after sending the acknowledgement message. However, to avoid the WKRNs constantly re-registering, in an alternative embodiment, upon completion of steps S815 and S820, the subroutine can continue with steps S535, S540 and S545 respectively (with the message being sent to the remote WKRN naturally) before ending the subroutine after sending the acknowledgement message.

Requesting Information

The processes described above are the mechanisms that allow nodes to link into the structure and maintain the structure under failures of nodes at points throughout the network. The protocol however is most useful when it can be used to request information relating to which nodes a particular node is aware of through the registration mechanisms.

The protocol defines a request handler to handle requests from external applications. These may be any application and do not necessarily need to be executing within the ALAN infrastructure, although it is expected that ALAN applications will make the most use of these facilities.

In the present embodiment, the request handler only services the request for the registration information. When called, the node returns the following information:
1. Discovery Protocol Version number
2. Node we last registered with.
3. List of nodes we will attempt to register with when our timeout expires.
4. List of nodes currently registered with us.
5. Number of descendents.

Using this information, at any point in the structure we can interrogate a node, find out which node it last registered with and all nodes that have registered with it, and then recursively traverse the tree until all nodes have been contacted.

The Overlay Construction Process

Once a structure is established using the above registration processes, the nodes in the network can now be interrogated. Using the information returned, the structure can be traversed to find out information from all nodes. This basic functionality allows us to in turn construct new overlay structures built on top of the discovery structure.

The basis to the overlay construction process is a discovery structure traversal using the request mechanism described above, combined with a method of requesting a particular metric result from a remote node. In the following example of constructing an IPTelephony gateway network on top of the discovery network, the metric used is the telephone number for the gateway. In the case of a network topology based structure, the metric would be some distance from a set of network landmarks.

Construction of an IPTelephony Gateway Overlay

An IPTelephony service permits telephone calls to be initiated from a computer connected to the Internet. Client software initiates the call, captures audio spoken by the human user, digitises, encapsulates and transmits the audio stream across the Internet to an IPTelephony Gateway using the Real-time Transport Protocol (RTP). A gateway is an EEP with a connected modem. A gateway proxylet decodes the client audio stream and transmits it to the destination telephone via the modem.

The service location requirement is to locate an IPTelephony Gateway closest to the destination telephone number as specified by country and area code. This service location function is realised by building a service-specific overlay on top of the discovery network.

Figure 11:
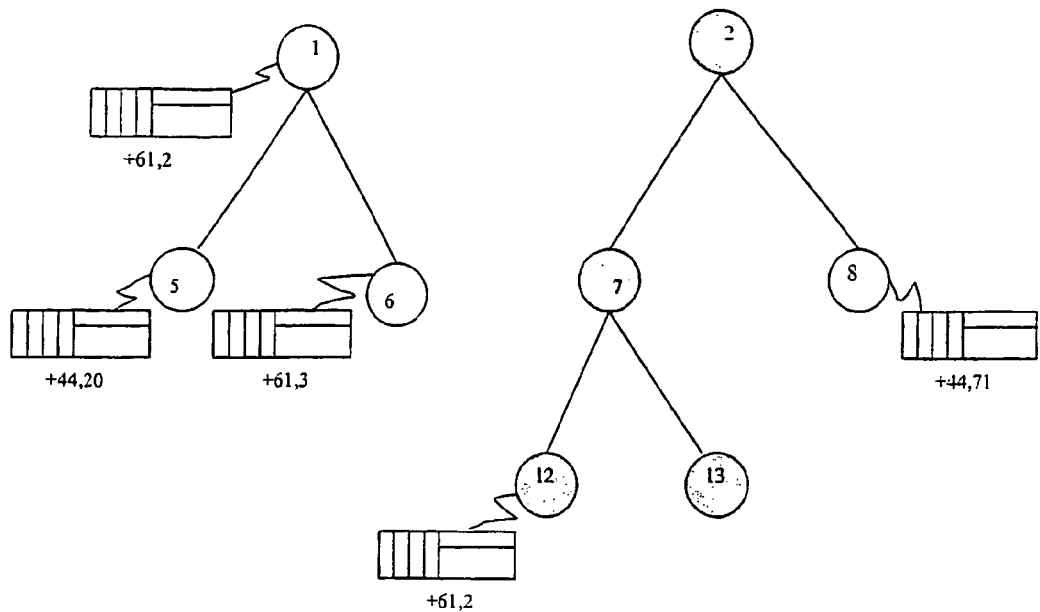
FIG. 11 is a schematic illustration of an example arrangement of a network of nodes some of which have a modem connection to the Public Switched Telephone Network.

The example construction of an IPTelephony Gateway overlay is now described with the use of the example Discovery network structure shown in FIG. 11.

FIG. 11 shows a discovery mesh where a number of nodes in the structure have attached modems. These modems are labelled with the international and area codes associated with the particular telephone line to which they are attached. This information allows the IPTelephony overlay to be structured.

Using this above structure at any point in the network a proxylet can be instantiated to begin the construction of the overlay. In our example we will choose Node 7 as the first node.

The first process undertaken by an overlay structuring proxylet when it begins executing on a node is for it to load the relevant settings for that particular node. These are extracted either from environment variables made available to the EEP or from a file on disk containing the specific settings.

Once the settings are loaded, the proxylet configures an interface that other nodes can use to interrogate the proxylet to request the settings.

An overlay structuring proxylet can be started in two modes, active or passive. An active proxylet attempts to propagate itself through the network, interrogating nodes that it is attached to in the discovery structure and instantiating running copies of itself on those nodes if one does not exist. This is the process undertaken by the first node initiated in the overlay. However, proxylets that the first proxylet initiates must not also perform this process, so they are started in passive mode to prevent them from attempting to propagate themselves. This allows the construction of an overlay to be controlled by a single proxylet in the network.

Initially Node 7 determines from the settings that it is not configured to handle IPTelephony gatewaying, and therefore undertakes propagation through the network in order to attempt to locate a node that can handle IPTelephony gatewaying.

Through the Discovery request interface, it requests the Discovery registration details. From this it extracts the node with which we last registered, and the list of any children currently registered with us. In the above example, this results in a list containing nodes 2, 12 and 13. Using this list, Node 7 attempts to contact an IPTelephony Gateway proxylet on each node in the list. If it fails to contact the proxylet, indicating that the proxylet is not running, a new proxylet is instantiated on the remote node in passive mode. In the present embodiment, the ability of a proxylet to remotely instantiate itself on a remote node is quintessential to the ability of the overlay to propagate itself throughout the ALAN structure. Combined with this, the ability for any proxylet to interrogate the Discovery structure provides the information for the proxylet to know where to propagate itself.

In our example, Node 7 determines that Node 2 also is not configured as an IPTelephony gateway. At this point Node 7, although not able to perform the gatewaying functionality acts as a service node in order to handle registration requests. This is necessary to link non-gateway nodes during the construction process before a gateway has been discovered. Thus, Node 2 links to Node 7, and sends periodic registration requests to ensure that Node 7 is still available, but at which point updated information can be returned to Node 2 to allow handoff to another node.

During this step, Node 2 returns a list of nodes to Node 7 containing the node it last registered with and its children. In this case, it returns nodes 1 and 8. A number of methods can be employed to ensure that the overlay does not perform cyclic propagation such as maintaining a list of nodes through which we have connected to the current part of the structure. Any method to prevent looping may be employed at this stage of the construction process.

At this point node 2 registers with node 7, and node 7 has a list of nodes to attempt to contact containing nodes 12, 13, 1 and 8. The process iterates again, with node 7 contacting node 12. As node 12 is a gateway capable node, Node 7 determines that it should register with node 12. It also determines that it contains a list of nodes that it is in the process of interrogating, which should be handed off to the new controller, node 12. Therefore, Node 7 now registers with node 12, and when Node 2 reregisters with node 7, it is told to attempt to register with node 12 as it is the new controller.

Figure 12:
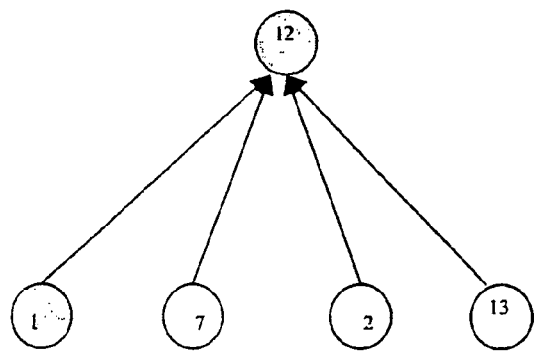
FIG. 12 is a schematic illustration of the network of FIG. 11 re-arranged according to a service-specific network overlay arrangement.

This above process is now repeated, as far as the control of tree traversal, proxylet instantiation and node interrogation is concerned. Node 13 is next registered as a child (no new nodes added to interrogation list). At this point the service overlay looks somewhat like the situation shown in FIG. 12. Node 12 now interrogates node 1, adding its children (5,6) to the interrogation list. Node 12 determines that node 1 is also gateway capable, and performs a comparison against its metrics. As both international and area prefixes match, node 1 is registered as a slave server. In the overlay, nodes can perform load balancing by using slave servers if their gateway facility is currently unavailable.

Tree traversal can be handed off at any point in this process if the protocol is configured to allow it to occur. This can occur throughout the process when new gateway servers are located, especially if they are slave servers. This makes key nodes in the overlay less loaded and able to better handle client requests, as they do not need to perform the process of interrogating nodes. Handing off the tree traversal also allows distribution of child nodes in the overlay as well since the default behaviour is to register child nodes with the current node interrogating them.

The next steps taken are described below.

The children from node 1 are added to the interrogation list. The list now contains 8,5,6,3,4. It is important to note that the Master WKRN in the discovery network returns the peers as its children.

Assuming that tree traversal handoff has occurred, node 1 now continues with the tree traversal after being handed the interrogation list. Node 8, is interrogated, it is directed to register with Node 1, and has the interrogation list handed off to it.

When Node 8 registers with Node 1, a metric comparison occurs by Node1. This allows Node 1 to determine how the new node is to be registered. It is determined that it is not from the same area or international prefix as itself and therefore is registered as the master of the +44 international area. Any other nodes with +44 international prefix are directed to register with Node 8.

As Node 8 has no children, no new nodes are added to the interrogation list. Node 8 continues the interrogation by contacting node 5. Node 5 is interrogated by node 8, which registers it as an area master. This is because it is from the same international prefix, but a different area. Therefore any new nodes with prefixes of +44,20 are directed to node 5 for registration. Tree traversal handoff occurs, and node 5 continues with the interrogation list containing only node 6.

The last node to be joined is node 6. Node 5 interrogates the node, performing a comparison. Determining that the node is from a different area and international prefix, it hands off the node to its master, Node 8. Node 6 then attempts to register with node 8, and is then handed off to Node 1 (the node that node 8 registers with). Node 1 gets the next registration attempt and determines that it does not have a registered node for the area +61,3 and registers node 6 as the new node for that area.

Figure 13:
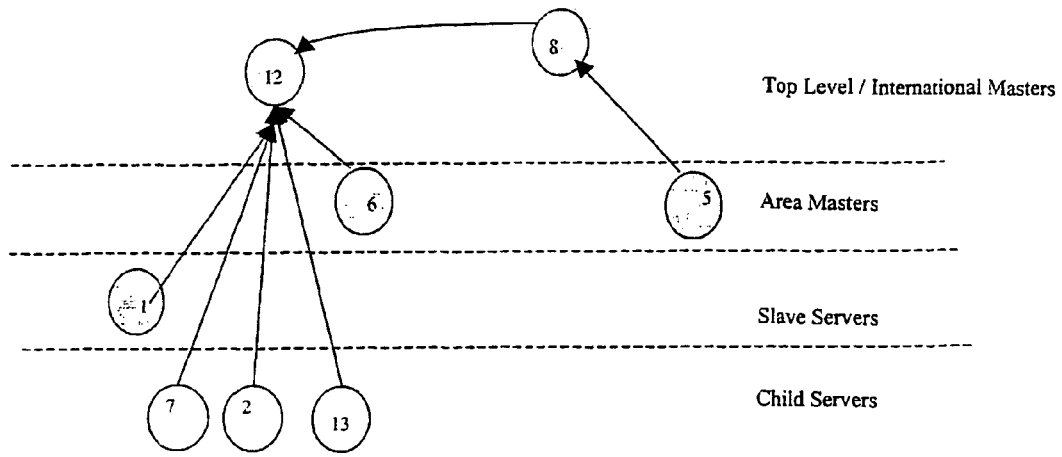
FIG. 13 is a schematic illustration of the handoffs performed to enable a client to traverse through the network of FIG. 12 to locate a specific desired node.

The final overlay structure is as shown in the FIG. 13.

In this example overlay, child servers are used to link into the overlay on EEPs which do not have the specific capabilities required by the overlay. Slave nodes are used to handle requests for gateway services based on load balancing policies, and top level and international masters perform handoff procedures to keep the tree Similar procedures can be put in place in the overlay structure to that in the discovery structure to ensure the structure is maintained. These include a set of nodes to attempt registration with, and periodic timeouts at which to perform registration attempts.

The process of locating an optimal IPTelephony gateway node is now simple. Given a destination telephone number we can link into the service overlay network from a local EEP. From there we traverse the service overlay network to find a gateway matching the destination country and area code.

Figure 14:
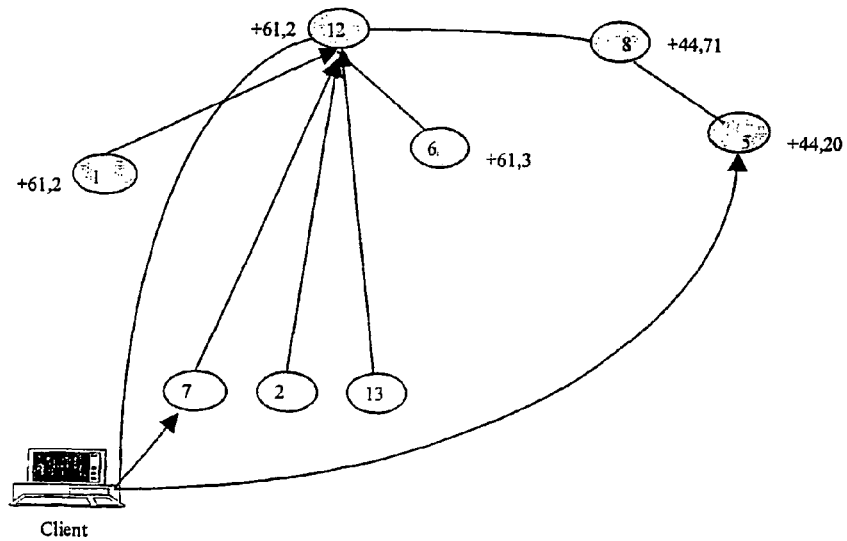
FIG. 14 is a schematic illustration in which an example IP Telephony structure is traversed when a client wishes to make a call to a telephone number with country and area codes +44,20.

This is shown in FIG. 14. Supposing a client wishes to make a call to a number in a telephone with country and area codes +44,20, an initial request is made to their local EEP, which returns the location of a closer EEP in the overlay. In this case, the local EEP is a child and simply returns the node it is linked with. This happens to be a top-level node, which returns the international master for that country code. The client then contacts that country master to determine whether there is an EEP registered that is closer to the number than the country master. The client is returned the area master for +44,20, which it can then contact in order to request the call. At this point service specific management can take place, such as scheduling or load balancing among any slave servers also registered with that area master.

What is claimed is:

1. A method of forming and maintaining a network of devices, some but not all of which devices are designated as well known root nodes, the devices being arranged to permit computer programs to be dynamically downloaded onto and executed on the devices and the devices being connected to one or more general computer networks, the method comprising:
   transmitting to each device via a network connection an ordered list of the addresses of the well known root nodes; and
   at each device, consecutively attempting to contact each of the well known root nodes, for the purpose of becoming registered or re-registered in the network, until (a) one of the well known root nodes is contacted, in which case the device attempts to register with the contacted well known root node, unless (b) prior to a well known root node having been successfully contacted, the device determines that the next well known root node which the device is to try to attempt to contact is itself, in which case the device becomes a master root node which will accept registration requests from other well known root nodes and register them as peers, whereby each well known root node is configured to register and/or re-register itself as a peer with no more than a single master root node at any one time.

2. A method as claimed in claim 1 wherein the devices are server computers operable to permit computer programs to be dynamically downloaded and run to provide services to computers connected to said one or more general computer networks.

3. A method as claimed in claim 1 further including forming an overlay network, the overlay network being a tree shaped network formed of a subset of the devices for use in performing a particular type of service.

4. A non-transitory computer-readable storage medium containing executable computer program code for downloading onto a device to cause it to become a device operable to carry out the steps of claim 1.

5. A device, for use in an active network of similar devices operable to permit computer programs to be dynamically downloaded onto and executed on the devices when the devices are connected to one or more general computer networks, the device being operable to form a well known root node, the well known root nodes forming a subset comprising some but not all of the total number of devices of the active network, the device including:
   means for receiving an ordered list of the addresses of the well known root nodes; and
   means for consecutively attempting to contact each of the well known root nodes, for the purpose of becoming registered or re-registered in the active network, until (a) one of the well known root nodes is contacted, in which case the device attempts to register with the contacted well known root node, unless (b) prior to a well known root node having been successfully contacted, the device determines that the next device in the subset of devices which the device is to try to attempt to contact is itself, in which case the device becomes a master root node which will accept registration requests from other well known root nodes and register them as peers, whereby each well known root node is configured to register itself with no more than a single master root node at any one time.

6. A method of forming and maintaining a network of devices arranged to permit computer programs to be dynamically downloaded onto and executed on the devices, the devices being connected to one or more general computer networks, the method comprising:

transmitting to each device an ordered list of the addresses of a set of well known root nodes, the set of well known root nodes being a sub-set comprising some but not all of the devices of the network; and at each device, consecutively attempting to contact each of the well known root nodes, for the purpose of becoming registered or re-registered in the network, until (a) of the well known root nodes is contacted, in which case the device attempts to register with the contacted well known root node, unless (b) prior to a well known root node having been successfully contacted, the device determines that the next device, in the subset of devices, which it is to try to attempt to contact is itself in which case it becomes a master root node which will accept registration requests from other well known root nodes and register them as peers, wherein each well known root node registers and/or re-registers itself as a peer with no more than a single master root node at any one time.

7. A method as in claim 6 wherein each well known root node is capable of becoming a master root node and accepting registration requests from other devices including well known root nodes so as to form a multi-rooted tree structure.

8. A method as in claim 7 wherein the multiple roots comprise members of the set of well known root nodes.

9. A method as in claim 6 wherein the well known root nodes elect an acting master root node with which the other well known root nodes register themselves as peer nodes.

10. A method as in claim 6 wherein the devices are server computers operable to permit computer programs to be dynamically downloaded and run to provide services to computers connected to said one or more general computer networks.

11. A method as in claim 6 further including forming an overlay network, the overlay network being a tree shaped network formed of a subset of the devices for use in performing a particular type of service.

12. A non-transitory computer-readable medium containing executable computer program code for downloading onto a device to cause it to become a device operable to carry out the steps of claim 6.

13. A device for use in an active network of similar devices operable to permit computer programs to be dynamically downloaded onto and executed on the devices when the devices are connected to one or more general computer networks, the device comprising:

means for receiving an ordered list of the addresses of a set of well known root nodes, the set of well known root nodes being a subset comprising some but not all of the devices of the active network; and means for consecutively attempting to contact each of the well known root nodes, for the purpose of becoming registered or re-registered in the active network, until (a) of the well known root nodes is contacted, in which case the device attempts to register with the contacted well known root node, unless (b) prior to a well known root node having been successfully contacted, the device determines that the next device in the subset of devices which it is to try to attempt to contact is itself in which case it becomes a master root node which will accept registration requests from other well known root nodes and register them as peers, wherein each well known root node registers itself with no more than a single master root node at any one time.

14. An active network comprising a plurality of devices according to claim 13.

15. A method as claimed in claim 1 wherein the well known root nodes are declared as absolute, network-wide global elements.

* * * * *